UNITED STATES PATENT OFFICE 2,562,797

PROCESS FOR THE PREPARATION OF POLY-
AMIDES FROM CAPROLACTAM

Theodoor Koch, Oosterbeek, and Noach Benninga,
Arnhem, Netherlands, assignors to American
Enka Corporation, Enka, N. C., a corporation
of Delaware No Drawing. Application June 28, 1949, Serial
No. 101,918. In the Netherlands March 12, 1948

4 Claims. (Cl. 260—78)

This invention relates to the preparation of high molecular weight linear polyamides by the polymerization or condensation of caprolactam of the formula

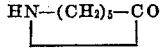

This application is a continuation-in-part of our copending application Serial No. 57,837, filed November 1, 1948, now abandoned.

One of the principal objects of the present invention is to provide a new and improved method for preparing macromolecular polycondensation products from monomeric caprolactam. A further object of the invention is to provide a method for preparing high molecular weight linear polyamide condensation products from caprolactam wherein the polymeric products obtained are characterized by being substantially color-free, or at least by being very much lighter than the monomeric caprolactam starting material in cases where for any reason the latter is appreciably colored.

The manner in which these and other objects and features of the invention are attained will appear more fully from the following description thereof, in which reference is made to typical and preferred procedures in order to indicate more fully the nature of the invention, without intending however to limit the invention thereby.

It is already known that macromolecular polycondensation products of the linear polyamide type may be made from formamidocaproic acid (French Patent Number 867,384).

An extension of this idea is found in Dutch Patent Number 60,070, where the formamidocaproic acid is prepared by heating caprolactam with formic acid and by bringing about the desired condensation or polymerization immediately thereafter by continuing the heating of the thus-produced formamidocaproic acid at a higher temperature.

It is a feature of the process of the Dutch patent that there is no intermediate separation of the formamidocaproic acid. The entire tenor of the disclosure of the Dutch patent is to the effect that the macromolecular condensation product is derived from the formamidocaproic acid which is formed as an intermediate. While the Dutch patent contains a general statement to the effect that the initial reactants need not be employed in equivalent quantities and that either reactant may be present in excess (page 1, lines 39 to 44), it is nevertheless for obvious reasons recommended that approximately equivalent quantities of reactants be employed since one mol of formic acid is required to react with one mol of caprolactam. Thus, the five working examples of the Dutch patent employ 1.4, 1.0, 1.5, 1.1 and 1.1 mols of formic acid per mol of caprolactam, respectively, formamidocaproic acid requiring one mol of each of these reactants for its formation. These molar ratios correspond to weight ratios of 56.7%, 40.7%, 62.2%, 44.3% and 44.3% formic acid, based on the caprolactam.

Thus the working examples of the Dutch patent in which, in general, a small or even a rather large molecular excess of formic acid is used, as well as its claim, show that in the first place the patentee's aim was first to convert completely into formamidocaproic acid all the caprolactam which was to be utilized for the polymerisation, and then only to finish immediately afterwards at a still higher temperature the polymerisation of the formamidocaproic acid in the second step, but in any case without intermediate isolation of the formamidocaproic acid.

In practice important disadvantages are, however, connected with the process of the Dutch patent. In the first place, the formic acid being present in so high a concentration attacks the metal apparatus to a not inconsiderable extent. The chemical attack upon the polymerisation apparatus by the caprolactam-formic-acid-mixture or by the formic acid alone is very substantial at the polymerisation temperatures under certain circumstances, even when the apparatus consists of a good type of special steel, such as $V_{2a}$—or $V_{4a}$—steel or Inconel or such like material.

Secondly, a large part of the formic acid is decomposed, while carbon monoxide is liberated, as a result of which gas bubbles are formed in the viscous mass of the condensation product being formed; these bubbles may be fatal to the successful spinning of thin threads from this mass, particularly when the polymerisation process and the spinning process are carried out in one continuous operation.

Thirdly, the formic acid causes an important increase in cost without seeming to play a permanent part in the final product.

According to the present invention, it has been discovered that condensation products of the linear polyamide type, practically free from lactam, can be formed by heating caprolactam with from 0.5% to 5% of formic acid, based on the weight of caprolactam, the heating being carried out in a single step at a polymerization or condensation temperature lying between approximately 150° and 300° C. The heating is continued until the desired degree of polymerisation has been attained, which degree of polymerisation may be readily determined by measuring the intrinsic viscosity of the polymer product. By "intrinsic viscosity" is meant the intrinsic viscosity of the high molecular weight linear polyamide product as measured in metacresol solution, as described in Dutch Patent No. 49,796.

Among the several advantages of the process according to the present invention is that the polymerisation of condensation may be conveniently carried out at normal atmospheric pressure, thereby dispensing with the need for high pressure autoclaves and the difficulties attendant upon working with apparatus of this kind.

A further, and extremely important, advantage of the process of the present invention is based on the fact that lactams such as caprolactam normally tend more or less to darken during polymerisation, apparently under oxidative influences. For this reason it has always been supposed hitherto (see for example, Dutch Patents Numbers 52,931 and 49,796) that oxygen or oxygen-containing gases must be rigorously excluded from the reaction zone. It has now been found on the contrary that when using from 0.5% to 5% of formic acid in accordance with the present invention, it is not at all necessary to take extreme precautions to exclude oxygen or oxygen-containing gases from the reaction zone, inasmuch as the pronounced reducing properties of the formic acid are sufficient to prevent or at least greatly minimize difficulties due to this source. Of course, it will be appreciated that near the end of the reaction it may be desirable to keep oxygen or oxygen-containing gases away from the reaction mixture inasmuch as by that time the initially-present formic acid may have disappeared by evaporation and/or decomposition.

As a corollary to the matters set forth in the preceding paragraph, it has been discovered that the use of 0.5% to 5% of formic acid in accordance with the present invention not only is capable of preventing darkening but also is capable even of exerting a substantial bleaching action upon an initially colored starting material. It will be immediately apparent that this is an extremely desirable attribute of the present process in view of the fact that the monomeric caprolactam starting material has the undesirable property of being colored yellow upon exposure to light. The color of the caprolactam starting material consequently determines the minimum intensity of the color of the polymerized products obtainable therefrom, so that when the starting caprolactam is tinted yellow to begin with (as is frequently the case) it follows that an undesirably yellow-colored polymer will result. Consequently, where it is necessary to prepare polymerisation products that are substantially colorless it has been regarded heretofore as essential to employ colorless caprolactam as starting material. Up to the present time, therefore, where the only available monomeric caprolactam was somewhat colored, either because of the method of its preparation or because of unavoidable exposure to light, the only way in which completely colorless linear polymers could be made was to subject the monomeric caprolactam to costly purification procedures, such as redistillation. Such purification procedures obviously involve undesirable economic losses in terms of time, energy and materials.

By operating in accordance with the present invention it has been found that, surprisingly enough, even substantially colored monomeric caprolactam starting material may be polymerized or condensed, and that during the course of the polymerization or condensation all or substantially all the color is removed. For example, upon heating a colored caprolactam with as little little as 0.5% of formic acid for 4 hours at 250° C., 55% of the original color was removed. When heating another sample of colored caprolactam with 1% of formic acid for the same time and at the same temperature, as much as 82% of the original color had disappeared. These colorimetric determinations were made with a Klett tintometer. In other words, it has been found that according to the present invention perfectly white polymers or condensation products may be obtained when the monomeric caprolactam is heated in the presence of 0.5% to 5% of formic acid, based on the weight of the caprolactam, even though the monomeric caprolactam starting material is more or less colored to begin with.

In further support of the concepts underlying the present invention, a detailed investigation of the importance of formic acid for the condensation of caprolactam has been carried out, particularly in order to answer the question whether the conversion of all the caprolactam into formamidocaproic acid, thus working in equimolecular ratios, is indeed necessary.

As a result of this investigation it was surprisingly found that it is not at all necessary to effect an intermediate conversion of the polymerisable caprolactam quantitatively into formamidocaproic acid and that the operation can take place with one single temperature step, viz. the polymerisation temperature, while, moreover, in this polymerisation one can work successfully with an unexpectedly slight addition of formic acid, whereby the caprolactam can be readily polymerised to a serviceable intrinsic viscosity. A sudden decrease of the polymerisability of the caprolactam only occurs below approximately ½% formic acid calculated on the weight of caprolactam.

The sudden decerease of the polymerisation effect is so pronounced that at a polymerisation temperature of 255° C. an intrinsic viscosity of almost 0.70 can still be reached in 24 hours when 0.8% formic acid is applied, whereas on the other hand the reaction "gets stuck" at an intrinsic viscosity of 0.05 when this addition of formic acid is reduced to one half, that is to say to 0.4% based on the weight of caprolactam.

On the other hand, it was observed additionally during the experiments that the disadvantageous effects of the chemical attack upon the apparatus, the carrying-over of caprolactam by the decomposition gases and caprolactam-transport by water vapor as a result of steam distillation (all three of these effects having been found to accompany operation in accordance with the process of the aforesaid Dutch Patent No. 60,070) unexpectedly are eliminated as soon as the quantity of formic acid employed was 5% or less, based on the weight of caprolactam, so that then in the continuous column process the operations could be carried out undisturbedly. While applying the usual precautions a spinnable and remarkably clear polymerisation product can immediately be obtained when operating in accordance with the present invention.

According to the experimental evidence the formic acid addition of about 5%, based on the weight of caprolactam, is more than sufficient to bring about the polymerisation process quickly enough and to the desired intrinsic viscosities, while further experiments have shown that an increase in the percentage of formic acid above 5% has practically no influence on the intrinsic viscosity of the polymer after a heating time of 24 hours. Hence it is definitely established that the conversion of all the caprolactam into formamidocaproic acid is entirely superfluous.

It is preferred to employ formic acid of the highest possible concentration in carrying out the practice of the present invention, formic acid concentrations of from about 98 to 100% being preferred. Lower concentrations may be employed, although less desirably.

When employing formic acid as the sole condensation agent in accordance with the present invention, very satisfactory results are achieved when an amount of formic acid rather nearer the lower limit of 0.5% to 5%, based upon the monomeric caprolactam starting material, is employed. In any case it is apparent that this relatively slight quantity of formic acid must be regarded as a polymerisation-accelerator and, under no circumstances, as a reaction component of an intermediate product which may or may not be suitable for isolation. In this connection it may be noted in passing that the use of 1% formic acid, which in practice is frequently sufficient, represents a caprolactam:formic acid molecular ratio of about 40:1.

The process of the present invention may be combined advantageously with the process described and claimed in the copending Theodoor Koch application Serial No. 42,283, filed August 3, 1948. According to this last-mentioned application, monomeric lactams having at least six carbon atoms, including caprolactam, are condensed by heating them in the presence of relatively minor amounts of preformed high molecular weight linear polyamides, the intrinsic viscosity of which is already at least 0.4. By combining the two processes an accelerated polymerisation reaction is effected, and at the same time a light colored polymer product is more easily obtained.

It has already been mentioned that the polymerisation or condensation of lactams in high pressure autoclaves is relatively less simple, particular difficulty being encountered when such a method is to be carried out continuously. The present process, by permitting operations at ordinary atmospheric pressures, therefore provides a simple method for operating in continuous manner wherein a vertically elongated reaction vessel is employed the bottom of which communicates by means of a conduit provided with a suitable pump communicating with spinning jets, the monomeric starting material and formic acid being fed to the top of the reaction vessel at a rate corresponding to the rate at which the molten linear polyamide is withdrawn from the bottom of the vessel for introduction to the spinning jets.

In addition to retaining all the advantages of the use of formic acid in general as disclosed in Dutch Patent No. 60,070 mentioned above, the improvement according to the present invention has the following specific advantages which the prior process does not possess. The reaction mixture is less corrosive toward the reactor. The process is less expensive. There is obtained a product having few or no gas bubbles, thereby permitting the spinning of fine threads. Heating at two temperatures is superfluous.

In order to indicate still more fully the nature of the present invention, the following examples of typical procedure are set forth, it being understood that this description is presented by way of illustration only, and not as limiting the scope of the invention. Parts are by weight unless otherwise indicated.

Example 1

100 grams of caprolactam are mixed with 4 grams of formic acid of 98% concentration. The reaction mixture is heated in an open vessel provided with a heating jacket into which is passed the vapor of a heat-exchange liquid boiling at about 255° C. The originally light-yellow colored reaction mixture is soon converted into a water clear melt. After 4 hours' heating the reaction mass becomes viscous and a slight evolution of gas occurs. After 20 hours the process is substantially completed and, after cooling, there is obtained a hard, perfectly white mass of linear polyamide the intrinsic viscosity of which, measured in metacresol, is about 0.8. The polymeric material thus obtained may be satisfactorily spun to colorless threads.

Example 2

25 parts of a polymer consisting of poly-zeta-heptane-carboxylic-acid amide having an intrinsic viscosity of about 0.9, measured in metacresol, are mixed with 100 parts of caprolactam heated to 210° C. 3 parts of anhydrous formic acid are then added to the heated mixture. The resulting molten mixture is caused to flow continuously through a vertically disposed reaction tube from the top downwardly. The height of the reaction tube is about 5 meters. The reaction tube is heated to 255° C. by means of vapor of the so-called Dowtherm heat exchange liquid flowing through a surrounding jacket. The bottom of the tube communicates with a spinning pump and a spinning jet by means of which a thread is spun continuously from the molten reaction product, the reaction mixture being introduced at the top of the tube at the same rate as the polymerised material is withdrawn from the bottom thereof by means of the spinning pump. The time during which each part of the reaction mixture remains in the heated reaction tube is about 15 hours.

When carrying out an otherwise similar condensation but without using formic acid, it was found to be necessary to raise the reaction time from 15 hours to 24 hours in order to obtain a final product of the same intrinsic viscosity. In the latter case, however, the color of the resulting polymer was distinctly darker.

Example 3

100 kg. of caprolactam and 1 kg. of concentrated formic acid are mixed in a melting vessel. After this mixture was melted, it was pumped by means of a measuring pump into a vertical tube consisting of V4a-steel about 6 meters high.

The tube was heated at 265° C. by diphenyl vapor under pressure.

The polymerising monomer gradually fell down into the heating column, and in about 24 hours it was converted completely into a polymer of an intrinsic viscosity of 0.8.

The lowest part of the column was kept at a temperature of only 230° C., because otherwise the spinning viscosity would have been rather low.

The polycaproic amide thus obtained could be readily spun to threads without further operations and could then be subjected to a cold or hot stretching process.

While specific examples of preferred methods embodying the present invention have been described above, it will be apparent that many changes and modifications can be made in the methods of procedure. It will therefore be understood that the examples cited and the particular proportions and methods of procedure set forth above are intended to be illustrative only, and are not intended to limit the invention.

What is claimed is:

1. A single-stage process for the polymerisation of caprolactam to a high molecular weight linear polyamide comprising heating the caprolactam with from 0.5% to 5% of formic acid, based on the weight of caprolactam, to a temperature lying between approximately 150° and 300° C.

2. A process as defined in claim 1, wherein the heating takes place under normal atmospheric pressure.

3. A single-stage process for the polymerisation of caprolactam to a high molecular weight linear polyamide comprising continuously supplying to a vertically elongated reaction zone a mixture comprising caprolactam and formic acid as polymerisation accelerator, the latter being present in the mixture to the extent of 0.5% to 5% based on the weight of the former, heating the mixture in the reaction zone to a temperature lying between approximately 150° and 300° C. to effect polymerisation of the caprolactam to the desired high molecular weight linear polyamide, and continuously withdrawing the high molecular weight linear polyamide product from the reaction zone at a point spaced from the point of introduction of the monomeric caprolactam-formic acid mixture thereto.

4. A single-stage method for producing a high molecular weight linear polyamide by polymerisation of monomeric caprolactam which comprises continuously introducing at one point of a heated reaction zone said caprolactam in admixture with concentrated formic acid as polymerisation accelerator wherein the formic acid is present in the mixture to the extent of 0.5% to 5% by weight based upon the monomeric caprolactam, and continuously withdrawing the high molecular weight linear polyamide product derived from the polymerisation of caprolactam from another point of the reaction zone at substantially the same rate at which the caprolactam-formic acid mixture is introduced thereto, said reaction zone being maintained at a temperature lying between approximately 150° and 300° C.

THEODOOR KOCH.
NOACH BENNINGA.

REFERENCES CITED

The following references are of record in the file of this patent:

UNITED STATES PATENTS

| Number | Name | Date |
| --- | --- | --- |
| 2,241,322 | Hanford | May 6, 1941 |

FOREIGN PATENTS

| Number | Country | Date |
| --- | --- | --- |
| 870,484 | France | Dec. 12, 1941 |

OTHER REFERENCES

Ser. No. 309,376, Friederich et. al. (A. P. C.), published April 20, 1943.